United States Patent [19]

Lipari

[11] Patent Number: 5,970,769
[45] Date of Patent: *Oct. 26, 1999

[54] APPARATUS FOR BENDING SHEET STOCK

[75] Inventor: B. J. Lipari, Evergreen, Colo.

[73] Assignee: Laser Products, Inc., Oak Ridge, Tenn.

[ * ] Notice: This patent is subject to a terminal disclaimer.

[21] Appl. No.: 08/790,171

[22] Filed: Jan. 29, 1997

Related U.S. Application Data

[63] Continuation of application No. 08/541,743, Oct. 10, 1995, abandoned, which is a continuation of application No. 08/054,451, Apr. 28, 1993, Pat. No. 5,456,099, which is a continuation-in-part of application No. 07/854,342, Mar. 19, 1992, Pat. No. 5,377,516.

[51] Int. Cl.⁶ .............................. B21D 5/08; B21D 28/02
[52] U.S. Cl. .............................. 72/131; 72/181; 72/11.1; 72/31.07; 72/37; 33/758; 364/474.2
[58] Field of Search ........................... 72/11.1, 129, 131, 72/181, 294, 324, 335, 337, 31.07, 37; 33/758; 364/474.2

[56] References Cited

U.S. PATENT DOCUMENTS

| | | | |
|---|---|---|---|
| 2,006,925 | 7/1935 | Klemp | 73/335 |
| 2,697,997 | 12/1954 | Burroughs | 72/32 |
| 3,074,459 | 1/1963 | Pavia | 72/129 |
| 3,296,991 | 1/1967 | Rawson | 72/335 |
| 3,299,681 | 1/1967 | Hautau | 72/7 |
| 3,393,547 | 7/1968 | Kortan | 72/131 |
| 3,688,534 | 9/1972 | Anderson | 72/32 |
| 3,783,253 | 1/1974 | Anderson et al. | 235/151.11 |
| 3,821,525 | 6/1974 | Eaton et al. | 235/151.1 |
| 3,879,979 | 4/1975 | Arai et al. | 72/338 |
| 3,914,971 | 10/1975 | Colbath | 72/178 |
| 4,100,780 | 7/1978 | Sassak | 72/7 |
| 4,115,859 | 9/1978 | Brisk et al. | 364/476 |
| 4,131,003 | 12/1978 | Foster et al. | 72/7 |
| 4,280,350 | 7/1981 | King et al. | 72/7 |
| 4,351,113 | 9/1982 | Eggertsen et al. | 33/137 |
| 4,366,689 | 1/1983 | Yajima | 72/7 |
| 4,513,366 | 4/1985 | Munekata et al. | 364/167 |
| 4,558,577 | 12/1985 | Trishevsky et al. | 72/12 |
| 4,689,750 | 8/1987 | Kishi et al. | 364/474 |
| 4,758,961 | 7/1988 | Uemura et al. | 364/474 |
| 4,773,284 | 9/1988 | Archer et al. | 76/4 |
| 4,794,542 | 12/1988 | Prockter et al. | 364/474.02 |
| 4,799,143 | 1/1989 | Tanaka et al. | 364/191 |

(List continued on next page.)

FOREIGN PATENT DOCUMENTS

| | | |
|---|---|---|
| 2704-388 | 9/1976 | Germany . |
| 58-112608 | 7/1983 | Japan ............ 72/129 |
| 61-297787 | 12/1986 | Japan . |
| 62-192212 | 8/1987 | Japan . |
| 63-154217 | 6/1988 | Japan . |
| 63-154218 | 6/1988 | Japan . |
| 63-154219 | 6/1988 | Japan . |

OTHER PUBLICATIONS

*Fabricator, The Official Publication of the Fabricators & Manufacturers Assoc. Intl.*, vol. 21, No. 1, Jan./Feb. 1991.
*Fabricator, The Official Publication of the Fabricators & Manufactures Assoc. Intl.*, vol. 20, No. 1, Jan./Feb. 1990.
*Fabricator, The Official Publication of the Fabricators & Manufacturers Assoc. Intl.*, vol. 20, No. 9, Dec. 1990.

Primary Examiner—David Jones
Attorney, Agent, or Firm—Sheridan Ross P.C.

[57] ABSTRACT

A side panel assembly is disclosed which is of simple construction and provides easy access to the assembly contents for servicing or the like. The side panel assembly includes a front wall (14), a back wall (12) and a side wall (16) which is bent to match the shape of the front (14) and/or back (12) wall. The front wall (14) is connected to the side wall (16) by inserting a fastener (30) through the front wall (14) and a pull-out tab (26) extending from the side wall (16). A method and apparatus for use in constructing the side panel (16) are also provided. The method and apparatus allow for automation of the lay-out, cutting to length, flanging and notching of the side panel (16).

9 Claims, 8 Drawing Sheets

U.S. PATENT DOCUMENTS

| | | | |
|---|---|---|---|
| 4,831,862 | 5/1989 | Ohashi et al. | 72/389 |
| 4,864,509 | 9/1989 | Somerville et al. | 364/476 |
| 4,872,862 | 10/1989 | Ewald | 72/7 |
| 4,910,984 | 3/1990 | Young et al. | 72/7 |
| 4,951,217 | 8/1990 | Clack et al. | 364/474.2 |
| 5,005,394 | 4/1991 | Sartorio et al. | 72/10 |
| 5,029,462 | 7/1991 | Wakahara et al. | 72/379 |
| 5,060,495 | 10/1991 | Naoomi et al. | 72/10 |
| 5,177,690 | 1/1993 | Seki et al. | 364/474.27 |
| 5,191,538 | 3/1993 | Yoneda et al. | 364/474.16 |
| 5,287,433 | 2/1994 | Prunotto et al. | 395/99 |
| 5,315,522 | 5/1994 | Kaufmann et al. | 364/474.07 |
| 5,377,516 | 1/1995 | Lipari | 72/37 |
| 5,456,099 | 10/1995 | Lipari | 72/131 |
| 5,621,511 | 4/1997 | Knudson | 72/186 |

APPARATUS FOR BENDING SHEET STOCK

RELATED APPLICATION

This is a continuation of application Ser. No. 08/541,743, filed on Oct. 18, 1995, now abandoned which is a continuation of application Ser. No. 08/054,451, filed Apr. 28, 1993, now U.S. Pat. No. 5,456,099 which is a continuation-in-part application of U.S. patent application Ser. No. 07/854,342 filed Mar. 19, 1992 and entitled "Method and Apparatus for Bending Sheet Stock" by Lipari, now U.S. Pat. No. 5,377,516. This related application is incorporated herein by reference in its entirety.

FIELD OF THE INVENTION

This invention relates generally to side panel assemblies, e.g., housings or enclosures, and associated construction methods and apparatus. More particularly, the present invention relates to a side panel assembly which includes a bent side panel and a removably attachable front wall.

BACKGROUND OF THE INVENTION

Side panel assemblies typically include a front wall, a back wall, and a side panel which extends between the front and back walls to form a housing or enclosure. In many applications, it is desirable to form the side panel of such an assembly from a continuous web of material which is bent to conform to the periphery of the front and/or back walls. Such an assembly may, for example, form a housing for electrical components or a container for articles of various types.

One application of such assemblies is in forming lighted channel letters, words or other designs in the sign industry. In this regard, a lighted channel letter is commonly formed by placing a light or lights within a three-dimensional letter shaped housing. The channel housing normally includes a transparent or translucent front wall or cover and a side wall or channel formed from metal which extends about the outer and/or inner periphery of the letter. The channel thus provides the housing with a depth sufficient to house the light or lights.

In manufacturing channel letters, it is desirable to provide easy access to the internal light source for servicing. In addition, it is desirable to sealably interconnect the channel to the cover and back plate to provide some protection against moisture penetration and undesired light leaks. A further consideration in manufacturing channel letters is minimizing construction material and labor costs. Thus, it is important to achieve ease of access for servicing and sealing protection without unduly complicating channel letter construction or increasing material costs.

Figure 1:
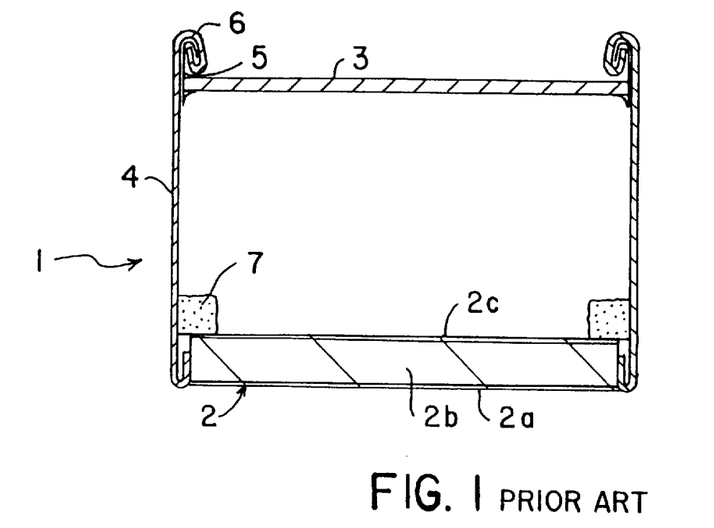
FIG. 1 is a cross-sectional view of a prior art channel letter.

One known type of channel letter is depicted in FIG. 1. The channel letter 1 comprises a layered base plate 2 including central wood layer 2b having metal sheets 2a and 2c attached to the major faces thereof; a plastic cover 3;

and a channel 4 extending between said base plate 2 and cover 3. The channel 4 is interconnected to the base plate 2 by inserting a screw, nail or other fastener through the channel 1 into the central layer 2b of base plate 2. In this regard, the base plate 2 is formed with a thickness sufficient to receive the fastener.

The interconnection between the channel 4 and cover 3 can also be seen in FIG. 1. The cover 3 is adhesively affixed to a flexible plastic flange 5 which is oriented substantially perpendicular to the cover 3. During construction, the channel 4 and flange 5 are bent together to form a seam 6 such that the flange 5 is captured within the seamed channel 4. An adhesive and/or sealant may also be applied at the flange/channel interface. Additionally, a strip of foam 7 is attached to the base plate 2 adjacent to the channel 4 to guard against light leaks.

One disadvantage of such channel letters is that they require a relatively thick base plate 2 to receive the screw. This increases the material requirements and costs of manufacturing. In addition, the seaming of the flange and channel 4 is a relatively complicated process and requires that the cover 3 be affixed to the flange 5, thereby further increasing construction costs.

Heretofore, forming the channel of a channel letter has generally been a labor-intensive process in which the required calculations and bending processes were largely performed manually. A channel can be formed from a length of stock material by forming a series of bends, e.g., corners or curves of appropriate shape at the appropriate positions on the stock. In practice, depending on the equipment used to form the bends, curves may be formed by a series of chord-like flat surfaces rather than one continuously curved surface. Several parameters must be considered in bending the channel to the appropriate shape. These parameters include the longitudinal positioning of the bends on the channel stock, the shape of the bends, and the sequence for making the bends. As used herein, the term "shape" includes the total angle of a corner or curve, the radius of curvature of a curve, and other bend characteristics. The material and thickness of the sheet stock may also need to be considered in forming the design.

Upon consideration, it will be appreciated that selecting a sequence for making the bends is problematic. For example, in bending a strip of stock material to form a channel, the bends cannot necessarily be made in the same sequence as they would be in writing the letter. This is because such a sequence might result in mechanical interference between the already bent portions of the stock and the remaining, as yet unbent, portions of the stock or the machinery used to bend the stock. That is, such a sequence might result in the unbent portion of the stock coming into contact with the bent portion or the machinery. Such interference can often be avoided by selection of a suitable sequence for making the bends.

The process of bending a strip of stock material to form a channel has therefore typically required the skill of an experienced operator. Commonly, such an operator would physically measure the front or back wall of the channel letter and use the measurements to determine the shapes and positions of the bends. Thereafter, the operator could often determine an acceptable sequence for making the required bends by drawing on experience and skill or through a trial and error process. The operator then normally manually attached bending instructions regarding the positions, shapes and sequence of the bends directly to the side strip. For example, the instructions could be manually written on the stock or on tape which was then attached to the stock. A machinist could then use the instructions to make the desired bends.

Such manual processes have a number of drawbacks. First, as stated above, such manual processes typically require the skill of an experienced operator to perform measurements, determine an acceptable sequence for making the bends, and provide instructions regarding the positions, shapes and sequence of the bends. In addition, such manual processes are generally time consuming, thereby increasing the manufacturing costs of the channel letter. Moreover, such manual processes are often inexact and highly susceptible to error. Thus, manual processes can be inefficient, costly and inaccurate.

A number of computer numeric controlled machines for bending metal are known. However, these machines do not determine the positions, shapes and sequence of bends for forming stock material into a channel of a channel letter. Such machines, therefore, do not solve the problems discussed above.

SUMMARY OF THE INVENTION

The present invention provides a side panel assembly of relatively simple construction which allows easy access to the assembly contents for servicing or the like. The present invention also provides a method and apparatus for use in constructing a side panel assembly which reduces the associated labor and material costs.

In accordance with one aspect of the present invention, an apparatus for use in forming stock material into a desired design is provided. The apparatus comprises a controller for receiving input information regarding the desired design and deriving bending information regarding bends for bending the stock material to form the desired design. Additionally, the controller means is operative for generating an output signal indicative of the derived bending information. The apparatus further comprises a processor for receiving the output information and processing the stock in response to the received signal.

The bending information derived by the controller can include information regarding the positions and shapes of the bends required for bending the stock material to form the desired design. In addition, the bending information can include information regarding a sequence for making the bends such that mechanical interference is avoided. The processor can comprise a printer for printing instructions regarding the bends, a die for notching the stock material, a cutting device for cutting the stock material to length for forming the design, and/or a bending head for bending the stock material.

In accordance with another aspect of the present invention, a novel side panel for use in constructing a side panel assembly is provided. The assembly normally includes a back wall, a front wall and the side panel, where the side panel is disposed adjacent an outward edge of the front wall. The novel side panel comprises a first panel section extending from a first end of the side panel adjacent the back wall to a forwardmost portion of the side panel, a second panel section extending rearwardly from the forwardmost portion of the side panel towards the front wall, and a third panel section extending inwardly from the second panel section in overlapping relationship with the front wall. The third panel section is adapted for interconnection to the front wall. A groove can be provided at the interface between the second panel section and the third panel section to facilitate angular movement of the third panel section relative to the second panel section. In addition, the third panel section can be provided with an opening for receiving a fastener. The side panel can further include a fourth panel section which extends inwardly from the first panel section in overlapping relationship with the back wall for attachment thereto.

In accordance with a still further aspect of the present invention, an apparatus for use in forming a side panel is provided. The apparatus comprises a driver for driving a strip of stock material, a tab former for forming a pull-out tab on a moving strip of stock material, and a first roll former for forming a hem on a moving strip of stock material. A second roll former can be provided for forming a flange on a moving strip of stock material. In addition, a mechanism can be provided for moving the first roll former relative to the second roll former, or vice versa, so as to accommodate stock material of various widths.

In accordance with another aspect of the present invention, an apparatus for use in forming stock material into a side panel of a side panel assembly comprises: a driver for driving the stock material along a selected path, a sensor for sensing movement of the stock material and generating a feedback signal indicative of such movement, a controller for receiving the feedback signal and deriving processing information therefrom, and a processor for receiving the processing information and processing the stock material responsive thereto. The processor can comprise a printer, a notcher, a device for cutting the stock material to length and/or a head for bending the stock material.

According to a further aspect of the present invention, a method for use in bending stock material into a desired design comprises the steps of inputting information regarding the desired design into a controller, operating the controller to derive bending information for use in bending the stock material into the desired design, transmitting a signal indicative of the derived bending information to a processor for processing the stock material and operating the processor to process the stock material. The method can further include the steps of driving the stock material along a selected path and receiving feedback indicative of stock material movement. Such feedback can be used in operating the processor.

In accordance with another aspect of the present invention a method for use in constructing a side panel assembly including a front wall and a side panel is provided. The method comprises the steps of providing a side panel having a hem portion where the hem portion includes a pull-out tab, bending the side panel so that the side panel matches the shape of an outer edge of the front wall, pulling the tab from the hem such that the tab extends inwardly relative to the hem, positioning the front wall in alignment with the side panel such that the front wall and tab are disposed in an overlapping relationship, and attaching the front wall to the tab. The front wall and tab can be attached for example, by inserting a fastener therethrough.

DETAILED DESCRIPTION

Figure 2:
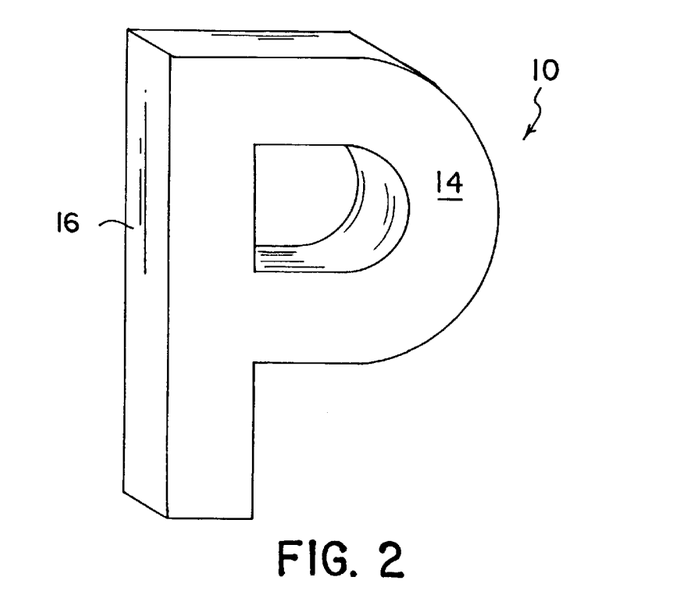
FIG. 2 is a perspective view of a channel letter constructed in accordance with the present invention.
Figure 3:
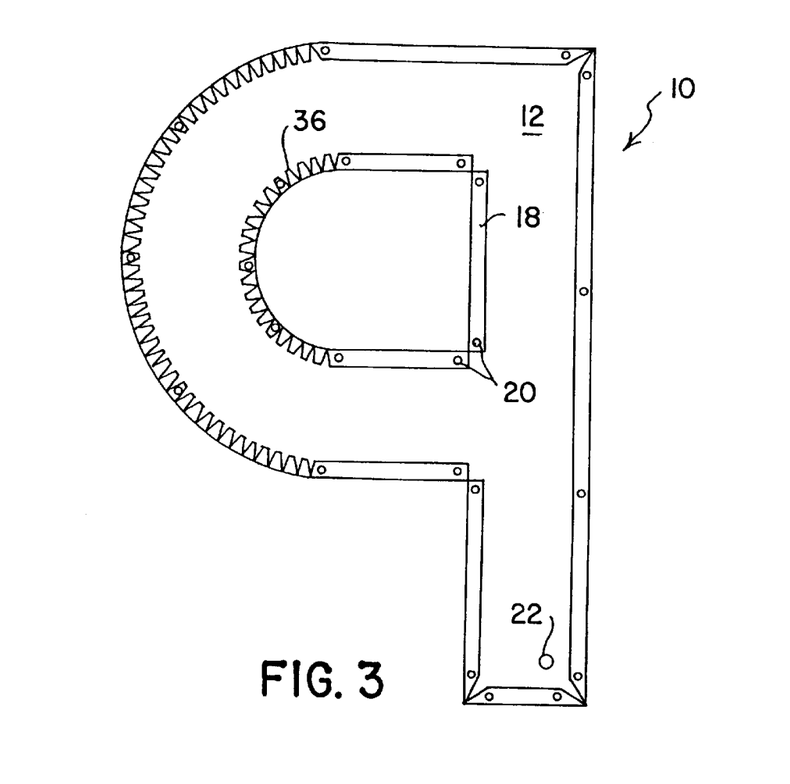
FIG. 3 is a bottom view of the channel letter of FIG. 2.
Figure 4:
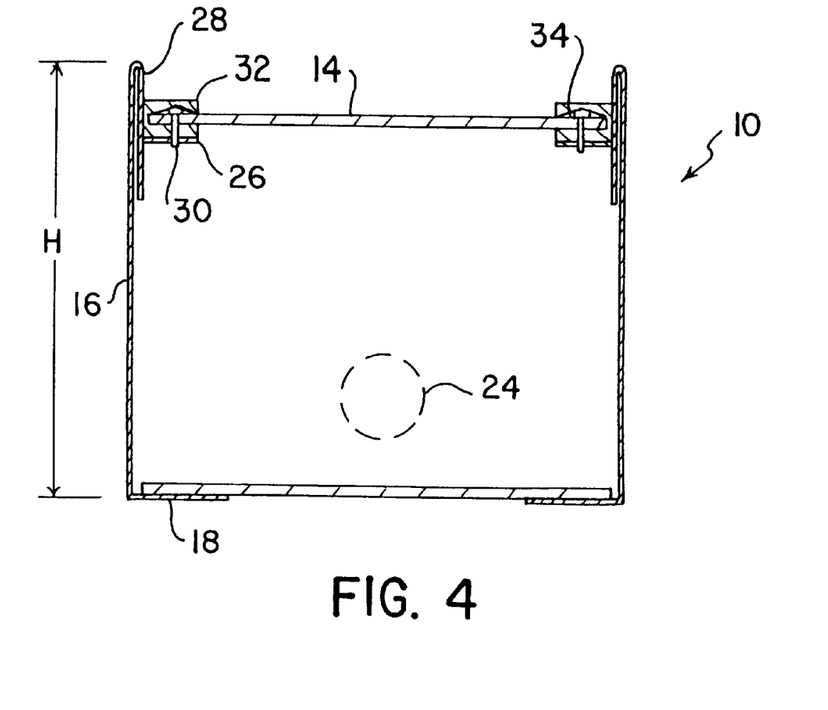
FIG. 4 is a cross-sectional view of a portion of the channel letter of FIG. 2.

Referring to FIGS. 2–4, a channel letter constructed in accordance with the present invention is generally identified by the reference numeral 10. Although the invention will be described with respect to a particular channel letter application, it will be appreciated that the invention is more generally applicable to a variety of side panel assemblies, e.g., for housing electrical components or articles of any sort, and associated manufacturing methods and apparatus. The invention is particularly advantageous for forming enclosures or housings having bent sidewalls; housings or enclosures having irregular, curved or complicated shapes; and/or recloseable housings which provide a seal to provide some protection against moisture penetration and leakage of light or the housing contents.

The channel letter 10 is constructed from a flat back plate 12, a front letter-shaped cover 14 and a sidewall or channel 16 which extends about the periphery of the channel letter 10. The back plate 12, which is commonly metal, can be a portion of a sign surface or a separately provided, letter-shaped plate, as shown. An opening 22 is provided in the back plate 12 for electrical access. The front cover 14, which is typically formed from plexiglas or other plastic material, is transparent or translucent to allow illumination of the channel letter 10 via an internal light source 24 (shown in phantom), e.g., a neon tube. The illustrated channel 16, which can be any suitable material such as steel, aluminum or other bendable material, is formed from a continuous sheet or strip of stock bent to the appropriate shape.

The channel 16 includes a flange 18 for interconnection with the back plate 12. In this regard, the channel 16 and back plate 12 can be attached by welding, adhesive bonding or other suitable method. In the illustrated embodiment, fasteners 20 such as rivets, screws or the like are used for this purpose. A sealant may be interposed at the interface of the channel 16 and back plate 12, if desired.

The channel 16 and cover 14 are preferably interconnected in a manner which allows easy access to the internal light source 24 for servicing and provides a seal to provide some protection against moisture penetration and undesired light leakage. In the illustrated embodiment, the cover 14 is interconnected to a pull-out tab 26 extending from a hem 28 of the channel 16 by fasteners 30 such as screws. For ease of construction, the fasteners 30 can conveniently be plastic push pins insertable through conventional expandable backings to anchor the pins in the tabs 26. A gasket 32, which may be formed with a recess 34 to accommodate the fasteners 30 extends about the periphery of the cover 14 to provide sealing protection at the channel/cover interface. It will be appreciated that gasket 32, which can be formed from a rubber or polymeric material, can be pulled back to provide access to the fasteners 30.

Figure 5:
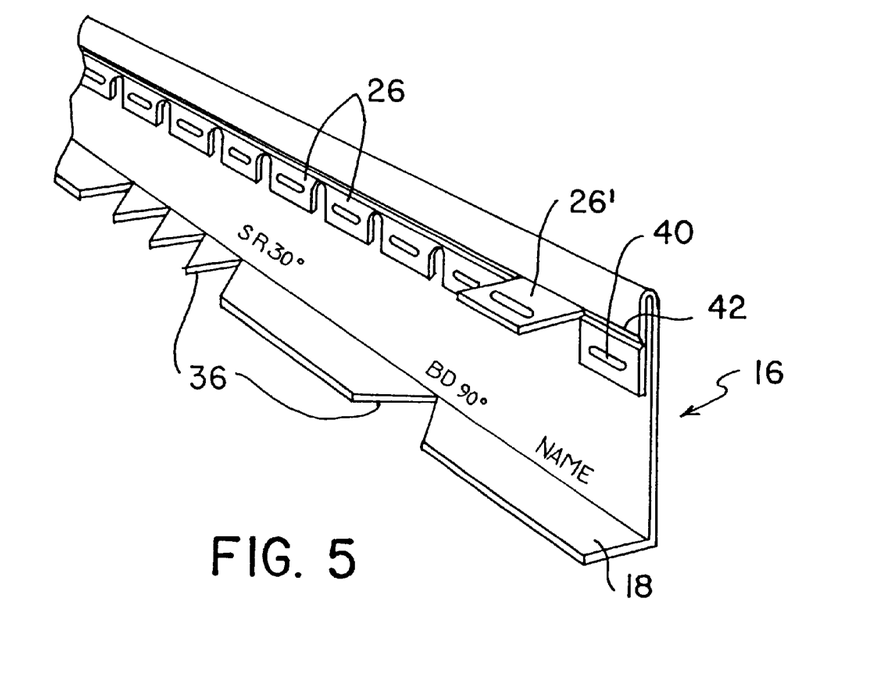
FIG. 5 is a perspective view of a channel constructed in accordance with the present invention.
Figure 6:
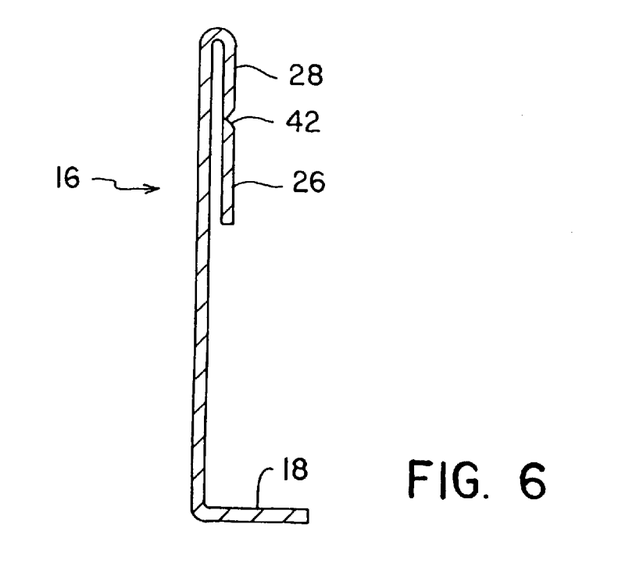
FIG. 6 is a cross-sectional view of the channel of FIG. 5.

FIGS. 5 and 6 show perspective and cross-sectional views of the channel 16 before the channel 16 is bent to the desired shape. As shown, notches 36 are formed in the flange 18 to facilitate bending of the channel 16 (see FIG. 3) and splicing of adjoining channel sections. In this regard, successive 30° notches can be utilized for curving the channel 16 and 90° notches can be utilized at corners. It will be appreciated that other angles could be utilized. Straight edge notches, e.g., areas where the flange 18 is completely removed, allow for easy overlapped splicing of adjacent channel sections.

Details of the pull-out tabs 26 are also shown in FIGS. 5 and 6 wherein only one of the tabs 26' is depicted in the pulled-out configuration. The tabs 26 can be formed continually along the length of the channel 16 to provide flexibility in interconnecting the channel 16 and cover 14, although only a few tabs will ordinarily need to be pulled-out for this purpose. Slits 38 are provided between adjacent tabs 26 to facilitate pulling-out the tabs 26. Each of the tabs 26 has an opening 40 of any suitable shape for receiving a fastener 30. The openings 40 can be oblong as shown to provide greater tolerance for fastener positioning. Additionally, a score line or groove 42 is provided at the base of the tabs 26 to facilitate pulling-out the tabs 26. Preferably, the groove 42 is formed with a substantially right angle cross-section so that a positive indication is provided when the tab 36 is fully extended and cover/tab parallelism is enhanced.

Channels of any size desired can be constructed in accordance with the present invention. The illustrated channel 16 has a return height H of between about 3 to 12 inches. The illustrated tabs 26 are about 0.5 inches deep, 0.5 inches long, or smaller, and are separated by slits 38 that are about 0.2 inches wide. The openings 40 are about 0.19 to 0.21 inches deep and can extend across as much of the tab length as is desirable and/or practicable. The channel 16 is curved tightly at the top edge thereof to provide a hem reveal of about 0.125 inches. The flange is between about 0.5 and 1.5 inches deep. It will be appreciated that these dimensions are exemplary and different dimensions may be selected for particular applications.

Figure 7:
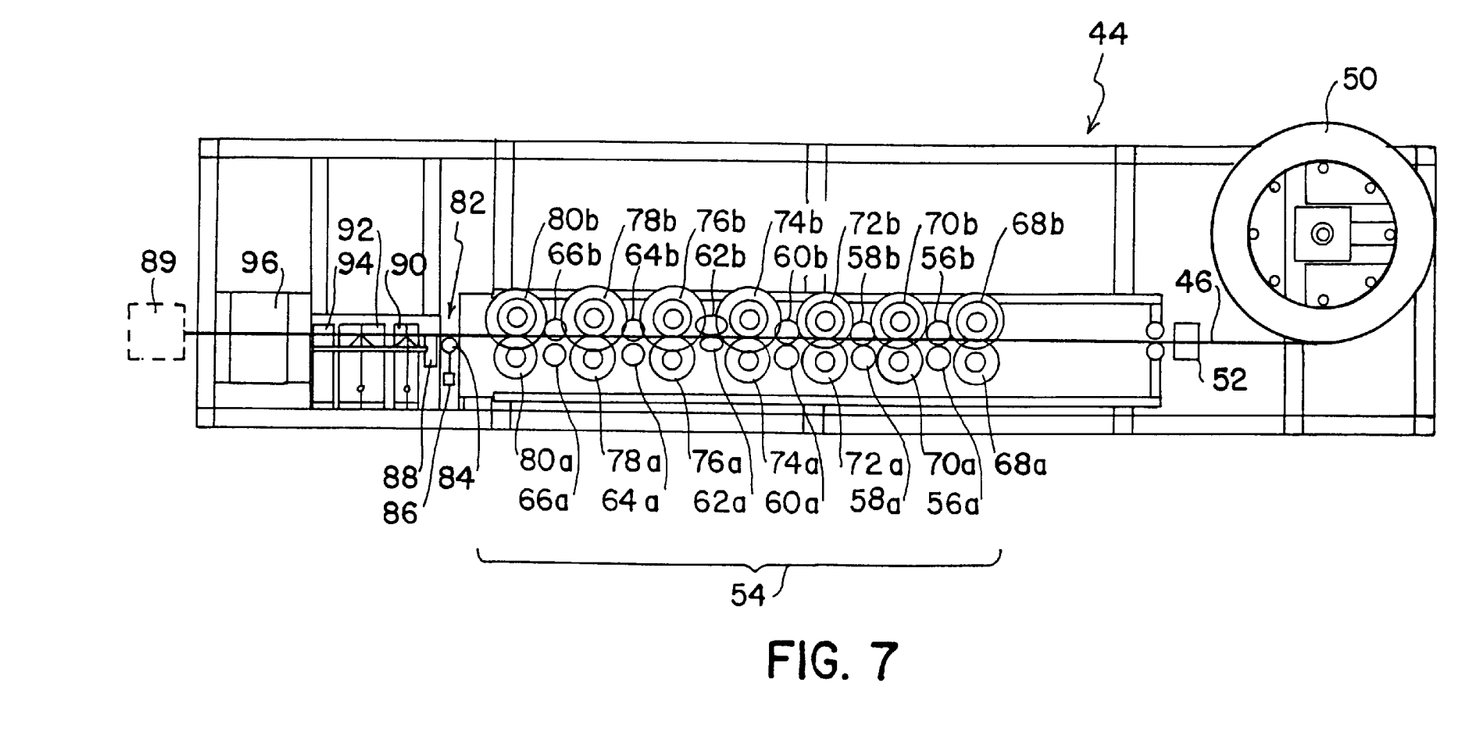
FIG. 7 is a top view of an apparatus constructed in accordance with the present invention.
Figure 8:
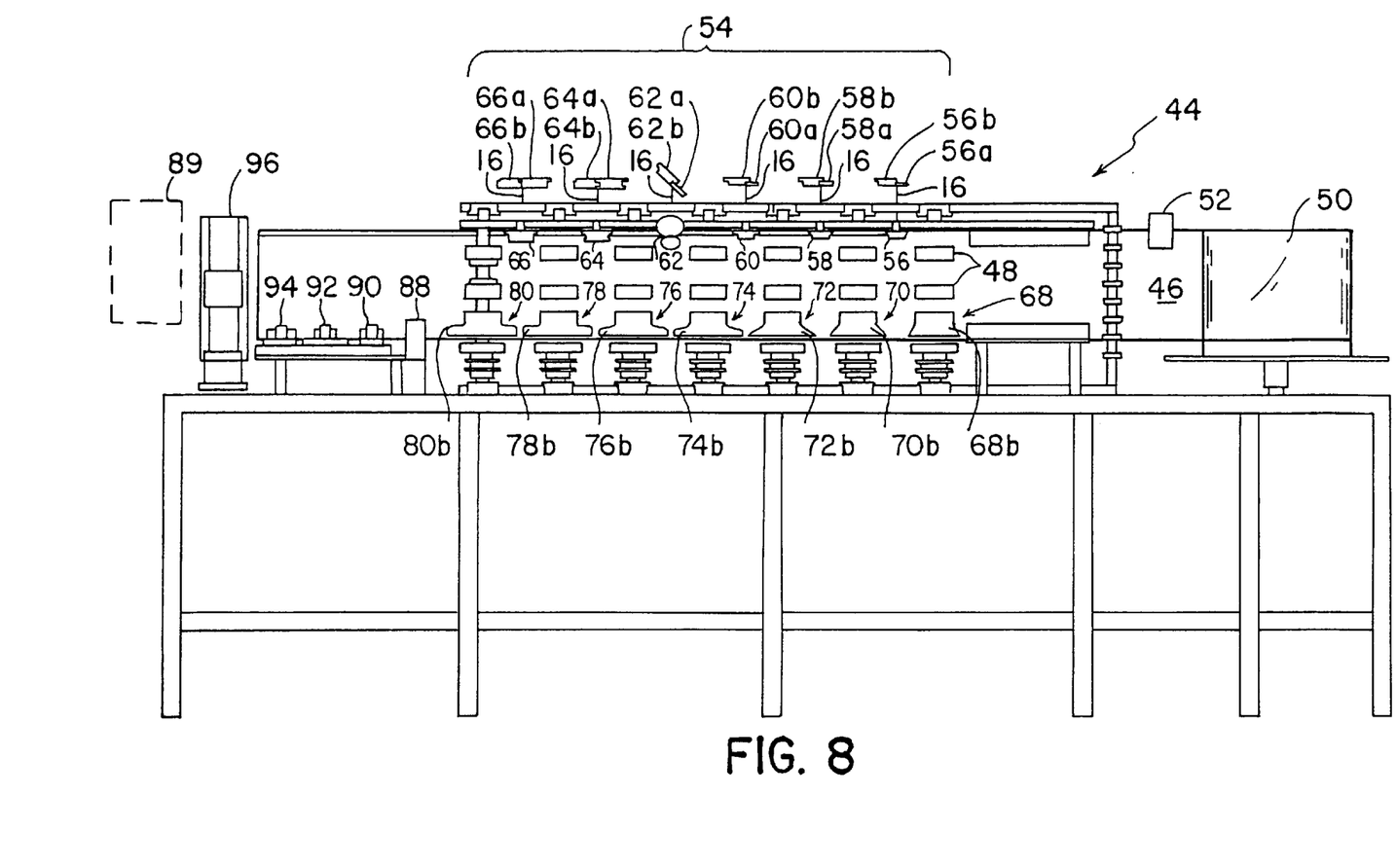
FIG. 8 is a side view of the apparatus of FIG. 7 with cross-sectional representations of the included roller dies.

Referring to FIGS. 7 and 8, an apparatus for use in constructing the channel 16 is generally identified by the reference numeral 44. Generally, the apparatus 44 takes stock 46 and forms the stock 46 into a straight channel 16 (as shown in FIGS. 5 and 6) or a finished bent-to-shape channel 16. In an in-line process, the apparatus 44 forms the tabs 26, the hem 28, the flange 18, the notches 36, and cuts the stock 46 to the appropriate length for forming the channel 16. In addition, the apparatus 44 prints bending instructions at the corresponding positions on the stock 46/channel 16 or includes an in-line device for bending the stock 46, thereby fully automating channel construction. It will be appreciated that the ordering of these steps can be varied from that described below with respect to the illustrated embodiment. The apparatus 44 reduces the time for forming a 30 inch high letter (including layout, cutting to length, flanging and notching) from about 21 minutes, according to a typical prior art manual process, to about 41 seconds.

FIGS. 7 and 8 show top and side views respectively of the apparatus 44. The stock 46 is conveyed through the apparatus 44, from right to left as shown in the figures, by drive rollers 48 which frictionally engage the stock 46. The illustrated drive rollers 48 are mounted on shafts which are rotationally driven in a conventional manner by a drive mechanism (not shown) including a hydraulic or other suitable power source and servo motors. Power is transmitted from the power source to the aforementioned shafts via appropriate linkage, such as a conventional chain and sprocket assembly, such that all of the drive rollers 48 are co-driven to operate at substantially equal drive velocities.

The stock 46 can be supplied in cut-to-length strips or in the form of a continuous web. In the illustrated embodiment, the stock 46 is provided in the form of a continuous web from a supply roll 50. The stock 46 is delivered from the supply roll 50 to a die 52 which forms the tabs 26. Preferably, the tab forming die 52 is capable of forming the tabs 26 on the fly, i.e., without the need to stop movement of the stock 46. In this regard, the die 52 can comprise a conventional roller mounted die or a stamp die which moves with the stock 46 during the tab forming procedure. In the latter case, the die can be fabricated to form multiple tabs in a single stamping motion to reduce the required stamping frequency, although the number of such multiple tabs may be limited by space requirements. The illustrated die 52 is a reciprocating stamp die which moves with the stock 46 and stamps 6 tabs 26 per cycle.

From the tab forming die 52, the stock 46 is delivered through a series of progressive roller dies 54 which simultaneously form the hem 28 at the top edge of the stock 46 and the flange 18 at the bottom edge. The dies 54 are arranged in opposing pairs in a manner known in the art such that the stock 46 bends as it passes therebetween. As shown, approximately 6 die pairs (56, 58, 60, 62, 64 and 66) can be used to progressively form the hem 28 and approximately 7 die pairs (68, 70, 72, 74, 76, 78 and 80) can be used to form the flange 18.

The bend formed at each pair of opposing rollers is determined by the cross-sectional configuration of the roller pair interface. The cross-sectional configuration of each successive roller pair for forming the hem 28 is shown schematically at the top of FIG. 8. At the first roller pair 56$a$ and $b$, the stock 46 is pressed between enmeshed rollers 56$a$ and 56$b$ such that the stock 46 bends to conform to the outward flange of roller 56$b$. At the second 58$a,b$ and third 60$a,b$ roller pairs of the hem forming rollers, the flange angle of rollers 58$b$ and 60$b$ is increased such that a substantially right angle bend is formed in the stock 46 by the combined action of the first three roller pairs 56–60. The fourth hem forming roller pair 62$a,b$ is disposed at an angle relative to the stock 46 to facilitate bending of the stock 46 at an angle greater than 90°. Finally, at the fifth 64$a,b$ and sixth 66$a,b$ hem forming roller pairs, the stock 46 is doubled over within a space provided between the opposing rollers to complete the hem 28.

A similar process is used to progressively form the flange 18. In this regard, a series of 7 progressive roller pairs (68$a$ and $b$, 70$a$ and $b$, 72$a$ and $b$, 74$a$ and $b$, 76$a$ and $b$, 78$a$ and $b$, and 80$a$ and $b$) are utilized. The flange angle of front rollers (68$b$, 70$b$, 72$b$, 74$b$, 76$b$, 78$b$, and 80$b$) is increased at each succeeding roller pair 68–80 such that a substantially right angle flange 18 is formed by the combined action of roller pairs 68–80.

The roller dies can be designed to accommodate any desired range of channel heights. Accordingly, the tab forming die 52, hem forming dies 56–66 and/or the flange forming dies 68–80 can be mounted on apparatus 44 for controlled raising or lowering thereof. In the illustrated embodiment, the die 52 and dies 56–66 are mounted on a rail which can be raised or lowered relative to dies 68–80 by operation of a crank to accommodate a broad range of channel heights. If desired, such raising and lowering can be automated, e.g., hydraulically driven.

In the illustrated apparatus 44, a sensor 82 is disposed downstream from roller dies 54 to provide feedback regarding the position and speed of movement of the stock 46 for use by the apparatus control system, as will be described below. Such downstream positioning of the sensor 82 has been found advantageous as the stock 46 can be stretched due to working by the roller dies 54. This stretching could otherwise result in a potential source of error in positioning the channel bends. Any suitable means for sensing movement of the stock 46 can be utilized. The illustrated sensor 82 comprises a hard rubber roller 84 disposed in frictional engagement with the stock 46. In this manner, rotation of the roller 84 is representative of stock movement. The associated encoder 86 generates an electronic signal responsive to rotation of the roller 84 and transmits the signal to the apparatus control system such that the position and speed of movement of the stock 46 can be accurately and continuously monitored.

In accordance with one aspect of the illustrated apparatus, a printer 88 is provided to print bending instructions and job information (see FIG. 5) directly onto the stock 46. The bending instructions, which can be printed in human-readable or machine-readable form, are preferably printed on the stock 46 at the locations where the corresponding bends are to be formed. For example, the bending instructions may include information regarding the shape of each bend and the sequence for making successive bends. In order to properly position the bending instructions, the printer 88 is driven by the apparatus control system in response to feedback from the sensor 82. In this regard, a variable speed, ink jet printer can be employed. The illustrated printer 88 can comprise, for example, the Videojet printer manufactured by Excel.

Alternatively, a channel bending head 89 (shown in phantom) can be provided in-line with the illustrated apparatus 44 to automatically form the channel bends. The channel bending head 89, which includes, for example, opposing rollers for bending the stock 46, can be driven in accordance with a signal from the apparatus control system in response to feedback from the sensor 82. It will be appreciated that incorporation of such a channel bending head in-line with the apparatus 44 reduces or eliminates the need to print bending instructions on the stock 46.

As noted above, notches 36 are formed in the flange 18 to facilitate bending of the channel 16 or splicing or adjoining flange sections. The illustrated apparatus 44 includes three notchers 90, 92 and 94, located downstream from printer 88, for this purpose. Each of the notchers 90–94 can comprise a hydraulic die. The first notcher 90 forms 30° notches for use in forming channel curves. The second notcher 92 forms 90° notches for use in forming channel corners. Other angles can be used if desired. The third notcher 94, which can be a 1 inch flat die, is used to completely remove sections of the flange 18 for simple overlapped splicing of adjoining channel sections. Again, the notchers 90–94, like the printer 88, are driven in accordance with a signal from the apparatus control system in response to feedback from the sensor 82, thereby allowing for accurate positioning of the notches 36.

After the notches 36 are formed, the stock 46 is cut to length by a suitable cutting device 96. In the illustrated embodiment, the cutting device 96 comprises hydraulic shears. Once again, the cutting device 96, like the printer 88 and notchers 90–94, is driven in accordance with a signal from the apparatus control system in response to feedback from the sensor 82, thereby allowing for accurate cutting of the stock 46.

Figure 9:
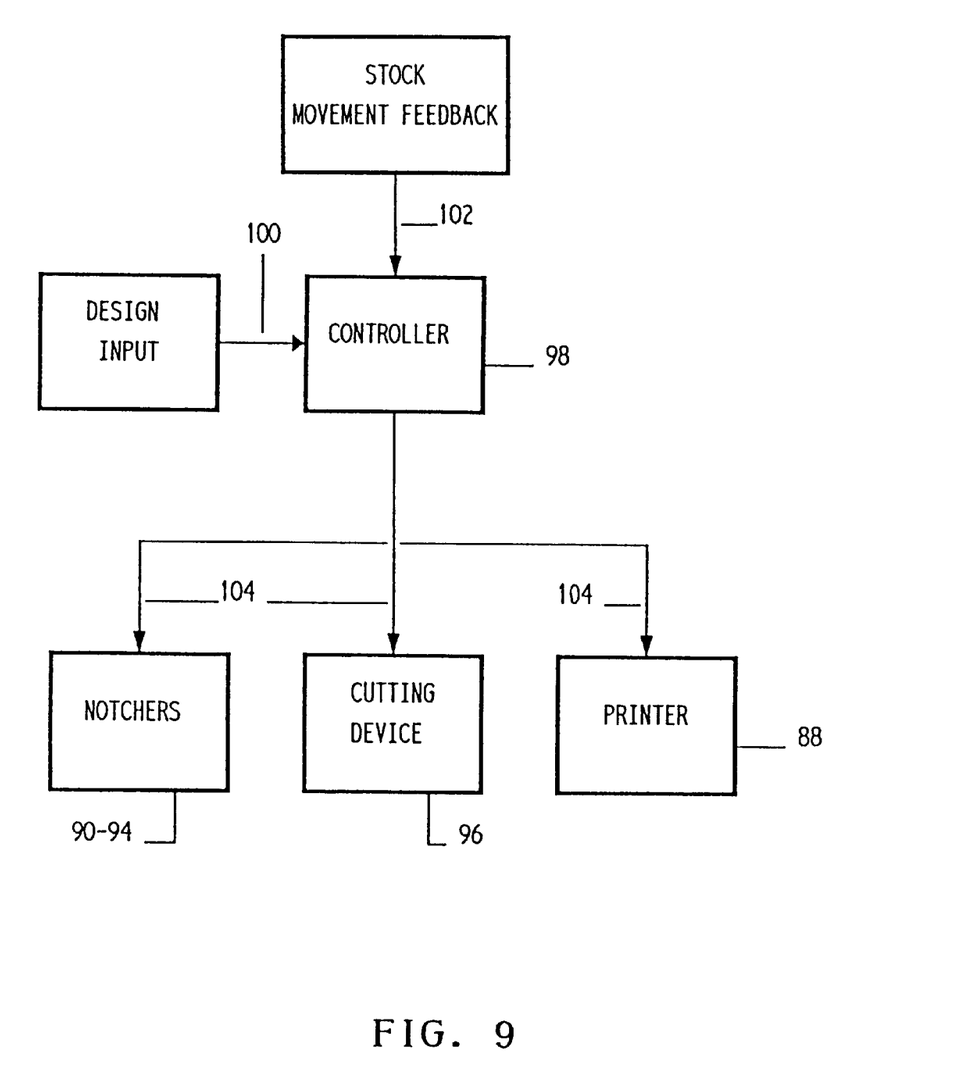
FIG. 9 is a flow diagram of the apparatus control system of the present invention.

The operation of the apparatus control system is depicted in the flow diagram of FIG. 9. The control system includes a central controller 98, such as a computer, for monitoring the progress of the stock 46 and initiating operation of the notchers 90–94, cutting device 96 and printer 88 or channel bending head 89 at the appropriate times. The controller 98 receives input design information regarding the desired channel size and shape (generally identified by arrow 100), receives feedback (generally identified by arrow 102) regarding the position and speed of movement of the stock 46 from the sensor 82, calculates the positions and shapes of bends for bending the stock to the desired channel configuration, calculates the total channel length, determines an acceptable sequence for making the bends, and transmits output signals (generally identified by arrow 104) directing the operation of the notchers 90–94, cutting device 96 and the printer 88 or channel bending head 89.

The input design information 100 for a specific job can be entered by an operator. The input 100 provides sufficient information to allow the controller 98 to determine the shapes, positions and sequence of the required bends. This information may include the stock material, the thickness of the stock 46, a description of the channel letter 10 or other design to be formed, and information regarding the size of the channel letter 10. For example, in the illustrated channel letter application, the operator may enter information including the particular letter to be formed, the print style, script or font of the letter 10, and the size of the letter 10 through a computer keyboard. As is well known in the art, the material and thickness of the stock 46 may affect the total length necessary to form a shape due to compression and extension forces exerted on the stock 46 during bending. It may also determine that the selected stock is unsuitable for the desired application. It will be appreciated that dimensional information pertaining to commonly used print styles, scripts and fonts can be stored in computer files for ease of use. Alternatively, measurements may be taken directly, for example, from the cover 14 or back plate 12, and entered into the computer. Additionally, the controller 98 may obtain dimensional information for the desired design by reading external computer aided design system or machine tool programs. The practice of exchanging information between software systems is well known to those skilled in the art.

The controller 98 then utilizes the input 100 to calculate position and shape information of bends for bending the stock 46 to the desired channel letter configuration. In calculating the position and shape information, the input information 100 may be converted into a standard industrial format for describing designs such as letters or other geometric shapes. Generally, the standard industrial formats are used to approximate the design in terms of a series of line and/or arc segments which collectively define an outline or perimeter of the design. For example, the design may be converted into the EIA format which is commonly used in the machine tool industry for driving computer numeric control machinery such as milling machines and the like. Other examples of standard industrial formats include the Gerber format which is commonly used in the electronics industry and the Hewlett-Packard graphics language. The format selected may depend in part on limitations of the machinery to be used in bending the stock 46 and characteristics of the stock 46. In this regard, certain machines cannot bend sheet metal into continuous arcs. Accordingly, arcuate design port ions may be approximated by a series of chord-like flat segments.

Additional information relating to the shapes and positions of bends for bending the stock 46 to the desired design m ay be entered by the user. First, the user may wish to select a particular starting and/or ending point for making the bends. For example, where the stock 46 is bent to form a closed design, i.e., where the ends of the stock 46 are welded together after bending, the user may wish to select the weld location so that the weld is hidden in a corner or other location. Conversely, the user may wish to position the weld in an open location for ease of access. Additionally, a particular starting point may facilitate bending of the stock 46 without interference. The user may also wish to select the direction, e.g., clockwise or counterclockwise, in which to proceed from the starting point, for example, to facilitate bending of the stock 46 without interference. Moreover, the user may wish to scale the stock dimensions to account for particular features of the stock, such as where the stock 46 is flanged or hemmed as described above, which can affect the bending characteristics of the stock 46. As can be appreciated, many other types of information relating to the positions and shapes of the bends could be entered as needed for any particular application.

After a shape has been selected, a mathematical representation of the shape can be produced in a manner known in the art. Where the design has been converted into a standard industrial format, the mathematical representation can define the series of lines and/or arc segments arranged end-to-end which form the design. The position and shape information, in turn, can be calculated using the mathematical representation. Thus, for the case of a series of bends between successive flat segments, the positions of successive bends on the stock 46 can be defined by reference to the lengths of the intervening flat segments and the shape of the bends can be defined by the angles subtended by successive segments. The position and shape information for a curved segment can be defined by a starting point, and ending point, and a radius of curvature or similar information. Where a curve is approximated by a series of flat segments, the series can be defined in a group, e.g., a set of uniformly spaced bends with a cumulative degree of bend equal to that of the curve. Thus, for example, an 18° circular curved portion of a given radius of curvature may be approximated by a series of 9 bends separated by flat segments of appropriate lengths. Many other ways of characterizing the positions and shapes of bends will be apparent to those skilled in the art upon reading this disclosure.

Figure 10:
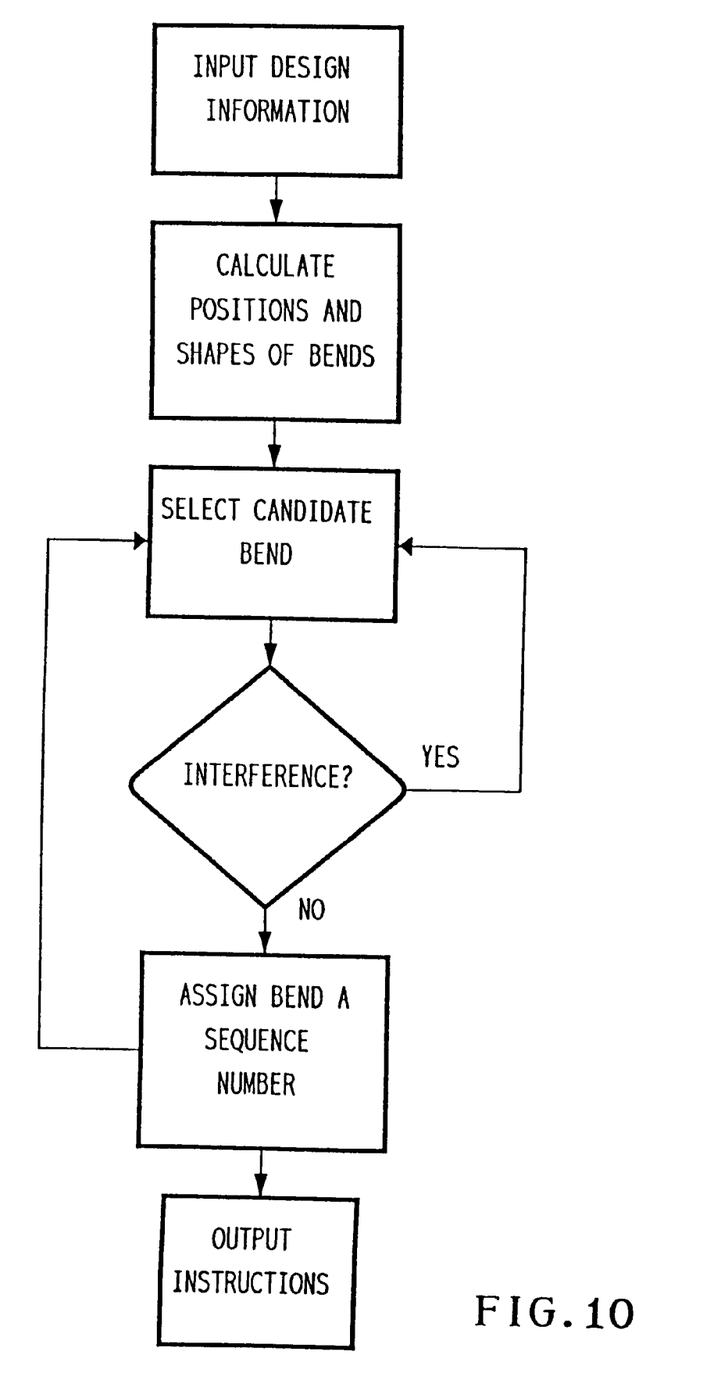
FIG. 10 is a flowchart of a method of use in accordance with the present invention.

The controller 98 can also be utilized to determine a feasible sequence for making the bends, i.e., a sequence for making the bends without mechanical interference between portions of the stock 46 or between the stock 46 and the apparatus 44. As is shown in FIG. 10, the process for determining a feasible sequence for making the bends is generally an iterative process of selecting a candidate bend, determining whether the bend can be made without interference, and selectively assigning the bend a sequence number or selecting a new candidate bend until all bends have been assigned a sequence number.

The process for determining an acceptable sequence for making the bends can be performed in a number of ways. Once the starting point is determined, the controller 98 can start with the initial bend at either end of the stock 46 and work toward the opposite end progressively projecting bends until the final design is achieved and recalculating and resequencing the bends if an interference results. Alternatively, the controller 98 can start with the premise that the stock 46 is initially bent to the predetermined design and progressively project bends until the stock 46 is straightened. It will be understood that an acceptable sequence of steps for bending the stock 46 from the predetermined design to a straight configuration can be reversed to provide an acceptable sequence for bending straight stock 46 to form the design. It is anticipated that the total number of calculations necessary for a particular application may be reduced through appropriate selection of the initial candidate bend, the sequence for selecting subsequent bends, and the starting premise, i.e., overall starting shape of the stock 46.

An exemplary process for determining whether a candidate bend can be made without interference is described below. It will be appreciated that many other processes are possible. To determine whether a bend is feasible, the controller 98 can store position information for a first portion of the sheet stock 46 on a forward or rearward side of the candidate bend and for the apparatus 44, project position information for a second portion of the stock 46 on the opposite side of the candidate bend for a number of points corresponding to progressive formation of the bend, and compare the stored information to the projected information to determine whether interference occurs. The stored position information for the first portion and the apparatus 44 may comprise a set of points in cartesian or polar coordinates, a set of points of origin and vectors corresponding to segments of the sheet stock 16, a set of mathematical equations defining segments of the stock 46, or similar information. The controller 98 may project position information corresponding to a substantially continuous area swept out by all sheet stock segments on the relevant side of the candidate bend over the course of forming the bend or a sampling technique may be employed, e.g., the controller 98 may project position information corresponding to only a relatively small number of discrete, intermediate positions of the relevant portion of the stock 46 over the course of forming the bend. Similarly, the controller 98 may project position information corresponding to the area swept out by substantially all segments of the stock 46 on the relevant side of the candidate bend, or the controller 98 may project position information corresponding to the projected movement of only selected portions of those segments.

Figure 11:
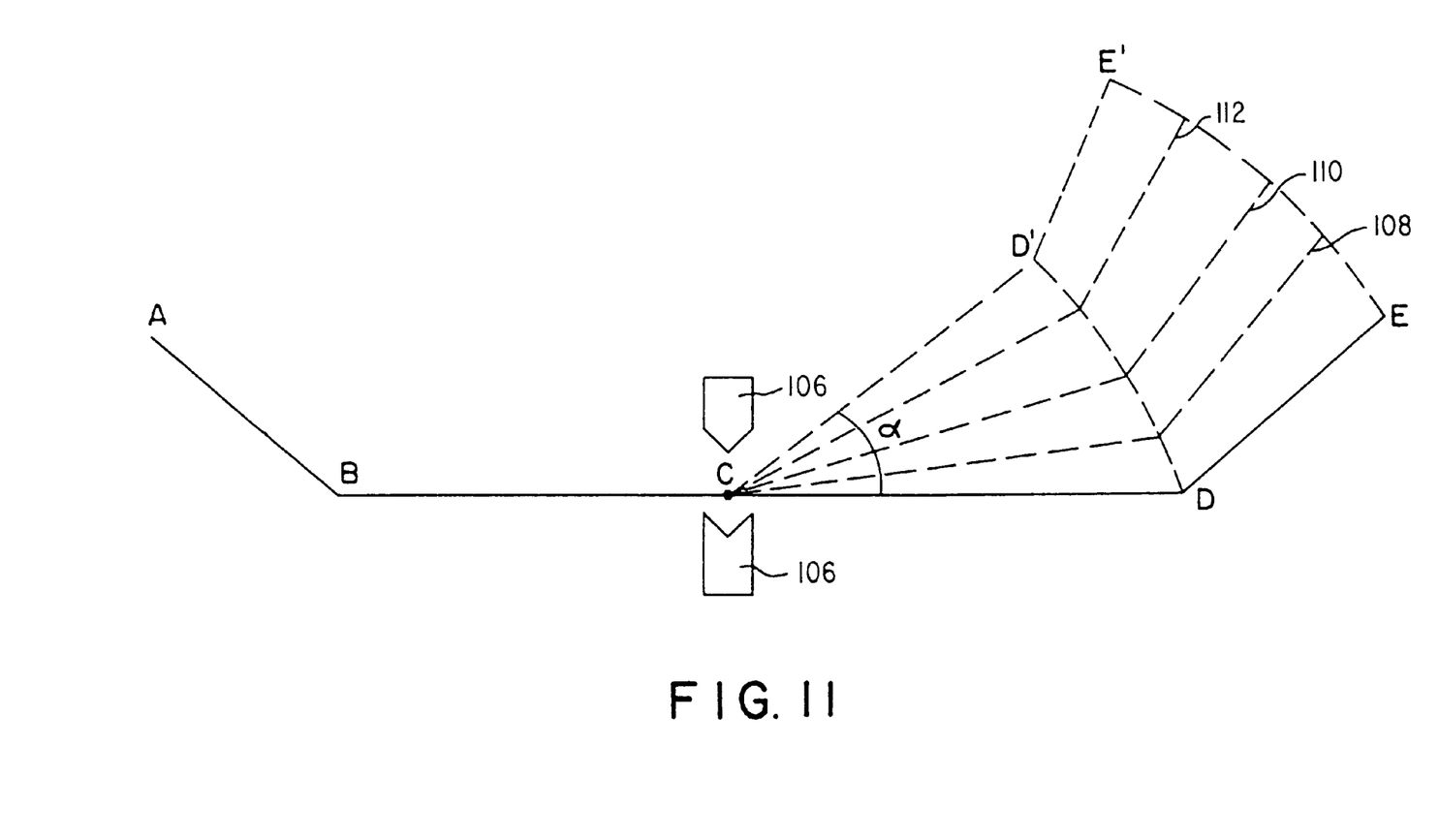
FIG. 11 is a side view of stock material graphically depicting methods for determining whether a hypothetical bend can be made without interference.

FIG. 11 illustrates some of the possible methods for use in projecting the position information in the context of a hypothetical candidate bend at point C. The segments ABCDE represent an initial configuration of the sheet stock. The position of apparatus elements 106, such as portions of a standard die, are also shown. The segments ABCD'E' represent the configuration of the stock 46 after forming the candidate bend. It will thus be appreciated that the stock 46 is bent through the angle $\alpha$ to form the candidate bend. In determining whether the candidate bend is feasible, the controller 98 may project position information corresponding to the area between segments CDE, CD'E' and arc EE'. Alternatively, the controller 98 may project position information corresponding only to the position of segments CDE, CD'E' and the intermediate positions generally indicated by arrows 108, 110 and 112, or corresponding only to arcs DD' and EE'.

The projected position information can then be compared to stored position information for segments ABC and the position of apparatus elements 106 to determine whether the candidate bend can be made without interference. That is, the stored position information for segments ABC and the apparatus elements 106 can be compared to the projected position information for overlap. If the candidate bend can be formed without interference, then the candidate bend is assigned a sequence number. The controller 98 can then store position information corresponding to the shape of the sheet stock including the tested candidate bend and select a new candidate bend. In FIG. 11, it is found that the candidate bend at C can be made without interference. The controller 98 can thus store position information for the position of segments ABCD'E' and use the position as the initial position in testing a subsequent candidate bend. This process can be repeated until all bends for bending the stock 46 to the predetermined design have been assigned a sequence number.

In operation, a job is initiated by entering input information including information regarding the shape and size of the desired design and the stock material. Based on this input information, the controller calculates the shapes and positions of the required bends, calculates the total channel length, and determines an acceptable sequence for forming the bends. The associated information files can then be downloaded to the apparatus for forming the channel. The apparatus forms the tabs, the hem, and the flange. In addition, the apparatus forms notches in the flange to facilitate subsequent bending and cuts the stock to length. The apparatus can also print bending instructions at the appropriate location on the stock or can communicate with a channel bending head to automatically bend the stock to the desired channel configuration. The apparatus can process stock at a rate of at least about 30 feet per minute with accuracy of about ±0.015 inches or better.

Although the present invention has been described with respect to specific embodiments thereof and applications thereof, other applications and modifications of the present invention will be apparent to those skilled in the art. It is intended that the present invention encompass such changes as fall within the scope of the appended claims.

What is claimed is:

1. An apparatus for preforming stock material to be subsequently bent into a desired design, comprising:

an advancing mechanism for longitudinally positioning of the stock material;

a frame of reference defined relative to the stock material for use in positioning the stock material;

a controller for receiving input regarding the desired design and deriving bending information for bending said stock to form said desired design, said derived bending information including the relative positions of the bends relative to the stock material;

a tool for marking the stock material with information indicative of the type, position or location of a desired bend; and a notcher associated with said controller for receiving a signal from said controller for notching said stock material to facilitate subsequent bending of said stock material into said desired design.

2. The apparatus of claim 1, further comprising roll forming means for folding the stock material to form a hem.

3. An apparatus for preforming stock material to be subsequently formed into a side panel of a housing, comprising:

a drive mechanism to advance the stock material along a longitudinal path;

a frame of reference for use in positioning the stock material;

a series of roller pairs for progressively forming a flange along one edge of the stock material;

a controller for receiving input information regarding the shape of the formed side panel, said information including the direction and position of each bend for forming the desired side panel, said controller generating an output signal indicative of the direction and position of each bend; and a notcher associated with said controller for receiving said output signal and for placing notches in said flange at the location of each bend to be formed in the stock material to assist subsequent bending of the stock material into a side panel of a housing.

4. The apparatus of claim 3, wherein the sensor provides feedback to the controller.

5. The apparatus of claim 3, further comprising a tool for marking said stock material to indicate the direction and location for each bend in the side panel.

6. The apparatus of claim 3, wherein the notcher comprises a die and tool to facilitate notching.

7. The apparatus of claim 6, wherein the die and tool can form notches of different angles and sizes.

8. The apparatus of claim 3, further comprising a cutting device for cutting the stock material to length for forming said design.

9. The apparatus of claim 3, further comprising a bending head for bending the stock material to form the desired design of the side panel.

\* \* \* \* \*